Aug. 23, 1949. F. B. ALLEN Re. 23,142

DISCHARGE HEAD

Original Filed June 24, 1943

INVENTOR
FRANK B. ALLEN
BY Frederick S. Duncan
ATTORNEY

Reissued Aug. 23, 1949 Re. 23,142

UNITED STATES PATENT OFFICE 23,142

DISCHARGE HEAD

Frank B. Allen, Verona, N. J., assignor to C-O-Two Fire Equipment Company, Newark, N. J., a corporation of Delaware Original No. 2,425,779, dated August 19, 1947, Serial No. 492,151, June 24, 1943. Application for reissue May 13, 1948, Serial No. 26,903

3 Claims. (Cl. 251—134)

This invention relates to improvements in a discharge head for a fire extinguishing apparatus and this application is a continuation in part of my application Ser. No. 464,686, filed November 5, 1942, in which is claimed the squeeze grip herein disclosed for a portable fire extinguisher.

Many of the fire extinguishers heretofore marketed include a puncturable disc for normally sealing the contents in the container and means for puncturing this disc and releasing the fire extinguishing fluid from the container. There are certain disadvantages in a construction of this kind, and it is therefore an object of my invention to employ an improved sliding valve for releasing the fluid from the container.

Among the objects of my invention is the provision of a discharge head in which the various bores, ports, and seats are so arranged that the body of the discharge head may be produced as by drop forging and the various bores, ports and seats may be provided by a minimum number of drilling operations requiring a minimum number of different positions of the head during these operations.

Other objects of the invention consist in the provision of a horizontally slidable valve in which provision is made for supporting such valve to travel in a definite horizontal line, for readily renewing the valve disc, and for readily removing the valve for the purpose of inspection, cleaning, and replacement.

Figure 2:
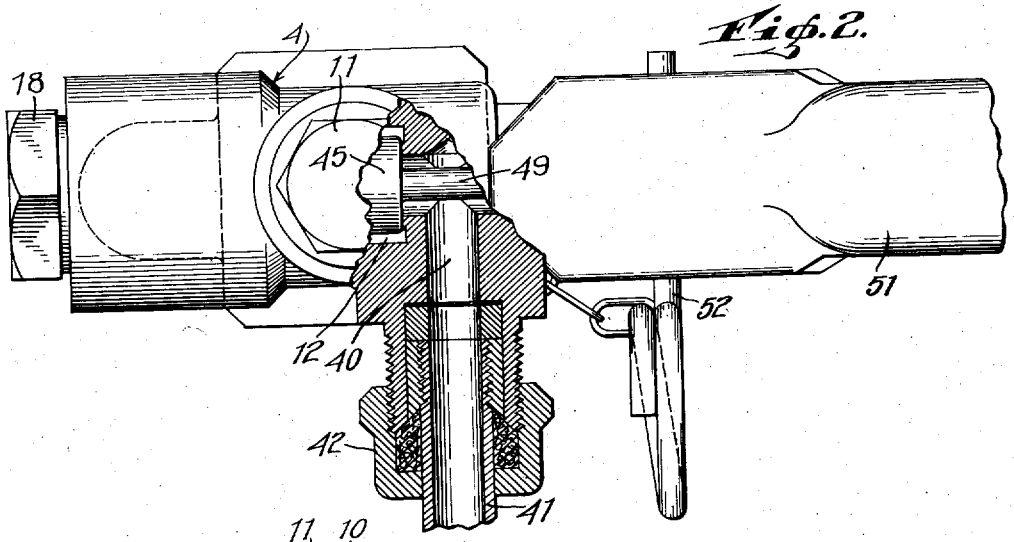
Figure 1:
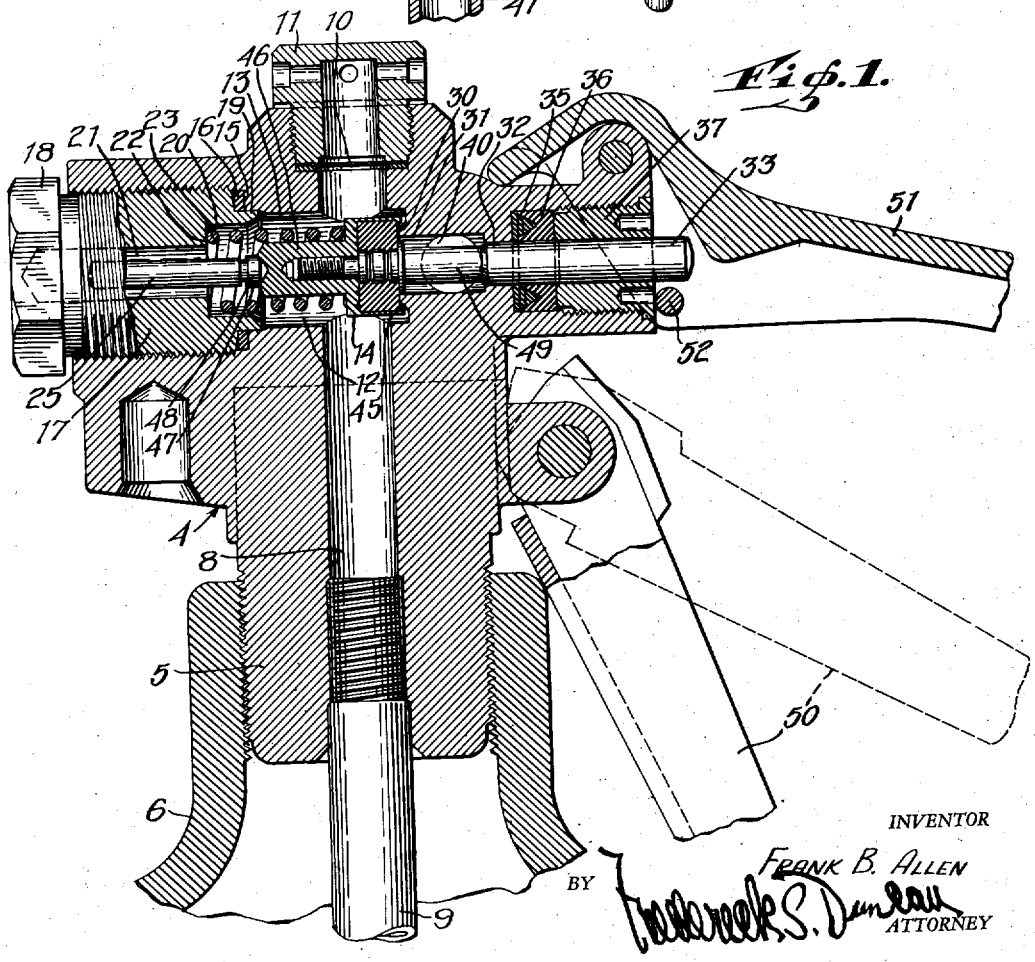

Other objects of the invention will appear from the following description taken in connection with the drawings, in which:

Fig. 1 is a vertical central section through the discharge head, disclosing the various bores and showing the valve in longitudinal section; and Fig. 2 is a top view disclosing in section the discharge port and a rotatable connection between the discharge head and a discharge horn.

My improved discharge head 4 is of general cruciform as disclosed in Fig. 1 and is provided with a lower cylindrical extension 5 which is threaded exteriorly for threaded engagement with the usual container bottle 6.

The discharge head is provided with a vertical through-bore 8 which at its lower end in the extension 5 is threaded for threaded engagement therewith of a syphon tube 9.

The upper end of the bore 8 is enlarged to form a shoulder on which is seated a sealing washer and a frangible sealing disc 10 and the wall of the bore is threaded to receive a threaded retaining plug 11 which retains the frangible sealing disc 10 on the shoulder. The plug 11 is of known construction and is provided with various radial ports as disclosed for anti-recoil purposes.

The discharge head is also provided with a horizontally extending through-bore generally indicated at 12 which intersects the bore 8. This bore at the point of intersection constitutes a valve chamber 13 for a valve generally indicated at 14. One end of this bore is enlarged to provide a shoulder 15 on which is seated a packing 16 held in position by a plug 17 in threaded engagement with the walls of said bore. One end of the plug is provided with wrench engaging faces 18 and the other end of the plug is provided with an extension 19 entering the valve chamber 13. This extension and the main body of the plug are provided with a bore 20 which has a reduced extension 21 in the body of the plug terminating in the head of the plug. This provides a shoulder 22 on which is seated a valve spring 23 and the reduced section of the bore provides a space in which operates an extension or manipulative means 25 carried by the valve 14.

The other end of the valve chamber 13 is provided with a valve seat 30 formed by reducing this section of the bore as indicated at 31 and the bore is further reduced as indicated at 32 to provide a sliding fit with the valve stem 33. The bore then is enlarged as indicated at 35 to receive a sealing washer 36 through which the valve stem passes and to threadedly receive a plug 37 which holds the washer in position. The plug is provided with a longitudinal bore in which the valve stem 33 operates.

As disclosed in Fig. 2, extending laterally from the bore 31 is a discharge port 40 to discharge fire extinguishing fluid into a horn or the like 41 which may be rotatably connected to the discharge head by a well known construction indicated in this figure and which comprises a removable cap 42 permitting the removal of the horn for the purpose of recharging the container through the port 40.

The valve generally indicated at 14 comprises a valve carrier or cup 45 provided with an extension 46 encircled by the valve spring 23 and this extension 46 may be provided with a thin walled reduced extension 47 which may be provided with a seat to receive the head 48 on the manipulative extension 25. The head of the manipulative extension 25 is preferably secured within the seat by a spinning operation as indicated in Fig. 1.

It is preferred to reduce the valve stem 33 at its section 49 located in the bore 31 in order to provide more clearance for the discharging and recharging fluid.

The valve stem is disclosed as preferably made removable from the valve carrier or cup for the purpose of facilitating replacement of the valve disc and it is preferably threadedly connected to the cup to provide for an adjustment to compress the valve disc and to seat the disc tightly in the cup and about the valve stem.

As disclosed and claimed in said application referred to, I use as operating means a handle construction comprising a lower pivoted main handle 50 which may be moved against the container so as to be out of the way and which will be raised into the position indicated by dotted lines when it is seized to lift and carry the container. The upward movement of this handle is limited as indicated in order that the upper handle member 51 may be seized by the same hand and may be pivoted downwardly to operate and unseat the valve by a squeezing operation after it has been released by the removal of the locking pin 52.

While I have shown and described one embodiment of my invention with particularity, it is to be understood that I reserve all rights to changes and modifications falling within the principles of my invention and the scope of the appended claims.

I claim:

1. A discharge head for a high pressure fluid container, provided with a straight vertically extending through-bore adapted to receive a syphon tube at its lower end and shouldered and threaded at its upper end and adapted to receive a safety disc plug, and provided with a straight horizontally extending through-bore intersecting said vertically extending bore and including a valve chamber at said point of intersection, a valve in said valve chamber provided with a valve stem on one side, a valve spring seated at one end against the other side of said valve, said horizontal bore including a reduced portion providing at one end of said valve chamber a valve seat, a horizontally and laterally extending port communicating with said reduced portion, and said horizontal bore having a further reduced portion providing a support and guide for the valve stem and an enlarged end portion adjacent thereto, a retaining plug in said enlarged portion, said plug being provided with a longitudinal through-bore adapted to receive the valve stem, the valve stem being of a length to extend beyond the outer end of said plug, and said horizontal bore being provided at its other end with a shoulder and an enlarged portion and a plug in said latter enlarged portion constituting a seat for the other end of said spring.

2. A discharge head for a high pressure fluid container, provided with a straight vertically extending through-bore adapted to receive a syphon tube at its lower end and shouldered and threaded at its upper end and adapted to receive a safety disc and plug, and provided with a straight horizontal through-bore intersecting said vertically extending bore and including a valve chamber at said point of intersection, a valve in said chamber provided with a valve stem on one side and a manipulative element on its other side, a valve spring surrounding said manipulative element and seated at one end on said valve, said horizontal bore having a reduced portion providing at one end of said valve chamber a valve seat, a horizontally and laterally extending discharge port communicating with said reduced portion and said horizontal bore having a further reduced portion providing a supporting guide for the valve stem and an enlarged end portion adjacent thereto, a retaining plug in said enlarged portion, said plug being provided with a longitudinal through-bore adapted to receive said valve stem, the stem of the valve extending beyond the outer end of said plug, and said horizontal bore being provided at its other end with a shoulder and enlarged portion and a plug in said enlarged portion provided with a reduced end extending into said valve chamber, the inner end of said plug being provided with a recess of different diameters providing a shoulder constituting a seat for the other end of said spring, the portion of said recess of smaller diameter extending adjacent to the outer end of the plug and adjacent to the outer end of said last mentioned enlarged portion of said horizontal bore, said manipulative extension operating in said smaller diameter portion of said recess in said last mentioned plug and extending when the valve is seated to a point adjacent the outer end of said last mentioned enlarged portion of said horizontal bore in position to be seized by the fingers after the plug has been removed for removing the valve from the discharge head.

3. A discharge head for a high pressure fluid container, provided with a straight vertically extending through-bore adapted to receive a syphon tube at its lower end and shouldered and threaded at its upper end and adapted to receive a safety disc and plug, and provided with a straight horizontally extending through-bore intersecting said vertically extending bore and including a valve chamber at said point of intersection, a valve in said valve chamber provided with a valve stem on one side, a valve spring seated at one end against the other side of said valve, said horizontal bore including a reduced portion providing at one end of said valve chamber a valve seat, a horizontally and laterally extending port communicating with said reduced portion, and said horizontal bore having a further reduced portion providing a support and guide for the valve stem and an enlarged end portion adjacent thereto, a retaining plug in said enlarged portion, said plug being provided with a longitudinal through-bore adapted to receive the valve stem, the valve stem being of a length to extend beyond the outer end of said plug, and said horizontal bore being provided at its other end with a shoulder and an enlarged portion and a plug in said enlarged portion constituting a seat for the other end of said spring, and said valve stem having a smaller diameter in said first mentioned reduced portion of said horizontal bore providing an enlarged passageway for discharging and recharging fluid passing the valve seat when the valve is unseated.

FRANK B. ALLEN.

REFERENCES CITED

The following references are of record in the file of this patent:

UNITED STATES PATENTS

| Number | Name | Date |
|---|---|---|
| 1,311,815 | Harris | July 29, 1919 |
| 1,761,821 | Fagan | June 3, 1930 |
| 1,895,472 | McCune | Jan. 31, 1933 |
| 1,953,358 | Mantz | Apr. 3, 1934 |
| 2,205,241 | Clark | June 18, 1940 |

FOREIGN PATENTS

| Number | Country | Date |
|---|---|---|
| 663,980 | France | 1929 |